May 13, 1969   H. HORA ET AL   3,444,377
NEUTRON PULSE SOURCE
Filed Aug. 12, 1965

Heinrich Hora
Benedikt Kronast
INVENTORS

BY Spencer & Kaye
ATTORNEYS

United States Patent Office 3,444,377
Patented May 13, 1969

3,444,377
NEUTRON PULSE SOURCE
Heinrich Hora, Garching, and Benedikt Kronast, Munich, Germany, assignors to Institut für Plasmaphysik Gesellschaft mit beschrankter Haftung, Munich-Garching, Germany, a company of Germany
Filed Aug. 12, 1965, Ser. No. 480,251
Claims priority, application Germany, Aug. 12, 1964, J 26,383
Int. Cl. G21g 3/00
U.S. Cl. 250—84.5      20 Claims

ABSTRACT OF THE DISCLOSURE

A neutron pulse source for producing very short neutron pulses of extremely high initial neutron flux densities. A given small volume containing a given density of heavy hydrogen isotopes in specified proportions in a hot plasma is heated with a laser beam pulse of a given amount of energy over a period of time. The nuclear reactions that result provide the desired neutron pulses.

---

Figure 1:
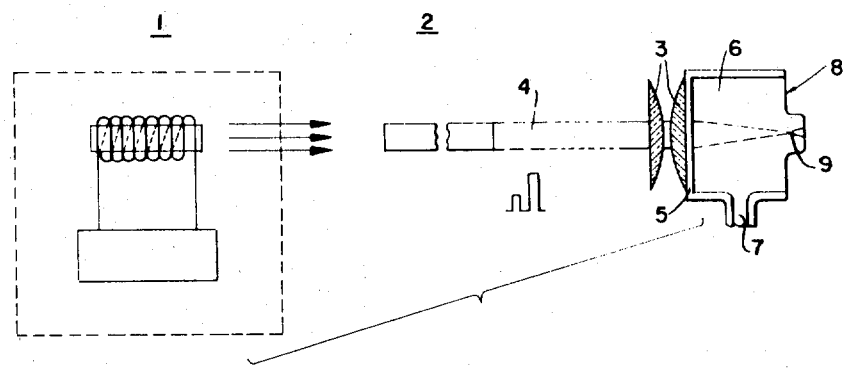

The present invention is related to neutron pulse sources. More particularly the invention relates to apparatus and methods for producing very short neutron pulses of extremely high initial neutron flux densities utilizing nuclear reactions between heavy isotopes of hydrogen in a hot plasma.

It is an object of the invention to provide a neutron pulse source which produces shorter neutron pulses and higher initial neutron flux densities than attainable with known neutron sources.

It is a further object of this invention to provide a method for producing extremely short neutron pulses, e.g., of a duration in the order of $10^{-9}$ seconds and less, and very high initial neutron flux densities, e.g., in the order of $5 \times 10^{21}$ up to and above $7 \times 10^{23}$ neutrons per square centimeter and second.

The foregoing and other objects of the present invention are achieved by focussing an output light beam pulse of appropriately short duration, of a high power laser arrangement onto a small volume containing heavy isotopes of hydrogen, especially a mixture of deuterium and tritium which may be condensed, i.e., solid; the density of the heavy hydrogen istopes within said volume should be high, e.g., $10^{19}$ to $10^{23}$ neclei/cm.$^3$.

According to a preferred embodiment of the invention a condensed (solid) mixture of 50 atomic percent deuterium and 50 atomic percent tritium is provided. A volume of about $10^{-7}$ cm.$^3$ (the volume may also be about $3 \times 10^{-9}$ cc./watt-sec. times the laser radiation pulse energy measured in watt-sec.) of said mixture is irradiated by a precisely focussed laser beam pulse having an energy content of about 30 joules or more and a duration preferably of $10^{-9}$ seconds or less, or as much as $10^{-7}$ seconds or less. The radiant energy of the laser light pulse is absorbed by said small volume of D-T-mixture which is heated up to a very high temperature sufficient to cause fusion reactions which yield the desired neutrons. If the laser light pulse energy is applied during a period of time equal or less than $10^{-9}$ seconds about $1.3 \times 10^{13}$ neutrons are produced during a period of time which is about $10^{-9}$ seconds. The reacting mixture expands and the neutron flux density (neutrons per square centimeter and a second) is at least $5 \times 10^{21}$ and under optimal conditions about $7 \times 10^{23}$ neturons/cm.$^2$ sec. on the surface of a sphere which has a volume hundred-times greater than the volume of the mixture at the end of the $10^{-9}$ seconds reaction period.

The irradiated mixture of deuterium and tritium must have sufficient high initial density within said small volume to ensure proper absorption of the laser light pulse. Thus the density within said small volume should be initially at least about $10^{20}$ nuclei per cubic centimeter. The use of gaseous mixtures is therefore inconvenient since it would involve pressures of the order of $10^2$ to $10^3$ kg./cm.$^2$. Preferably the mixture of the hydrogen isotopes is solidified by cooling or adsorbed or absorbed in a solid body, e.g., a thin foil of titanium, zirconium, palladium and the like.

If a metal foil saturated with heavy hydrogen isotopes is irradiated by the laser light pulse, metal of the foil is evaporated in addition to the absorbed hydrogen. It is true that this is not desirable because of the accompanying radiation losses, however, the metal vapor atoms travel slower than the hydrogen atoms because of the smaller masses of the latter so that the energy of the laser light is primarily absorbed in the hydrogen vapor front of the originating vapor jet.

According to another feature of the invention first a laser pulse of smaller energy is produced which causes evaporation of hydrogen and some metal of the foil, and immediately following said first pulse a second high energy pulse is shot into the vapour cloud produced by the first pulse so that the temperature of the hydrogen vapor is increased to such a value that the desired nuclear reactions take place. The succeeding pulses of different energies may be produced by a single laser arrangement or by two synchronized laser arrangements. If two lasers are used the beams of these lasers may be focussed by a single optic arrangement, e.g., a lens of sufficient area to receive two parallel and closely spaced beams. Alternatively, entirely or partially different optical means may me employed for focussing both beams which may be introduced through different windows into a vacuum chamber comprising a target or the like.

Figure 2:
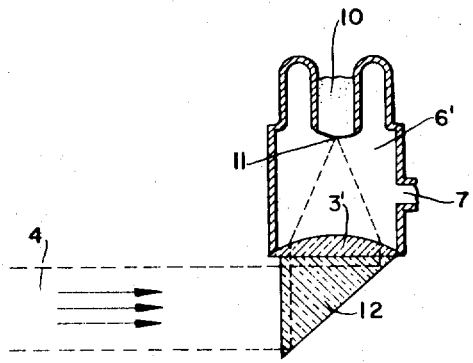

Embodiments of the invention will be described with reference to the accompanying drawing in which:

FIGURE 1 is a schematic sectional diagram of apparatus for producing neutron pulses of extremely short duration and very high neutron flux density, according to the invention and FIGURE 2 is a schematic diagram of a portion of a modified apparatus, according to the invention.

Referring to FIGURE 1, a typical embodiment of the invention includes a high power laser arrangement comprising an oscillator portion 1 adapted to produce a light output pulse of about 10 nanoseconds (1 nanosecond=$10^{-9}$ sec.) duration and having an energy of about 10 to 100 megawatts. The output light pulses of the oscillator 1 are amplified by at least one cascaded laser amplifier 2 to some $10^9$ to $10^{10}$ watts whereby simultaneously the duration of the pulse is shortened. The final light pulse may have an energy content of 10 to 100 watt-seconds.

The laser oscillator 1 and laser amplifier 2 may be of well known construction and need not be described in detail.

The output light pulse beam 4 of the laser arrangement 1, 2 is focused to a diameter of about $10^{-3}$ cm. by means of a mirror, quartz or sapphire optic 3. The focus point must be within an evacuated chamber since any gas penetrated by the highly focussed beam would be ionized and cause excessive absorption losses. Thus the light pulse is directed through a planar window 5 into a vacuum chamber which may be connected by a vacuum line 7 to a vacuum system, not shown, which comprises means for introducing the necessary hydrogen isotopes into the chamber 6. In the depicted arrangement the lens optic system 3 is arranged in front of the window 5, however, in an alternative arrangement the focussing optic means may be positioned within the vacuum chamber and/or form the window 5 as shown in FIGURE 2 by lens 3'.

The wall portion 8 of the vacuum chamber opposite of the window 5 is made of a material having a low neutron absorption coefficient, e.g., aluminum. At this wall and in the focus of the optic means 3 a deuterium-tritium mixture is provided comprising preferably essentially 50 atomic percent deuterium and 50 atomic percent tritium. The mixture 9 to be irradiated may be solified by liquid helium. Wall 8 may alternatively consist in part or entirely of or within the chamber 6 provided with a metal foil which has good hydrogen absorptive properties.

The vacuum chamber may be sealed permanently in which case a palladium tube may be attached to line 7 for introducing a mixture of hydrogen isotopes into chamber 6. The chamber 6 may be evacuated by condensing all of the gases save hydrogen which is then brought by absorption or a further lower temperature condensing step into the focus point of optic means 3. The protruding portion of wall 8 makes possible to utilize a maximum proportion of the generated neutrons and to position objects to be irradiated by neutrons in close proximity of the point of origin of the neutrons.

The modified embodiment of the invention partially shown in FIGURE 2 differs from FIGURE 1 in that window 3' is formed by a part of the optical system which further comprises a prism 12 for directing the laser pulse through the window lens 3' forming the bottom wall of vacuum chamber 6'. The wall portion of chamber 6' opposite of window 3' forms a kind of Dewar bottle 10 adapted to receive liquid helium. The bottom portion of the Dewar bottle may be formed of a metal foil which absorbs hydrogen well and forms a target.

The apparatus shown in FIGURE 2 may be operated in a number of ways. Foil 11 may be subjected from outside to hydrogen of relatively high pressure (e.g., 1 kg./cm.$^2$=14.2 p.s.i.) and caused to absorb the heavy hydrogen by application of heat. The heavy hydrogen loads the entire thickness of the foil by diffusion and is available at the inner wall side for producing a vapor cloud as described above. Alternatively, the mixture of heavy hydrogen isotopes may be introduced through vacuum line 7 from a vacuum system or a hydrogen-permeable tube, and may be solidified at or absorbed by the inner side of foil 11. Prism 12 may be omitted if the laser arrangement, which is not shown in FIGURE 2, delivers a perpendicular beam. The beam may alternatively be deflected by a mirror which may be a concave mirror serving as focussing means as well.

The beam may be introduced through a lateral window into chamber 6' (FIGURE 2) and the foil may then be positioned at a lateral wall portion of Dewar bottle 10.

A special advantage of the neutron pulse source according to the invention is that the laser arrangement 1, 2 may be positioned in a rather great distance from the neutron pulse source proper which comprises elements 3 to 9 (FIGURE 1) or the elements shown in FIGURE 2. The neutron pulse source proper according to the invention is inexpensive, simple and compact. A number of experiments may be assembled with individual neutron pulse source elements, as shown in FIGURE 1, or as shown in FIGURE 2, and may be operated at convenience by means of a single laser arrangement 1, 2 in sequence.

The invention is not limited to the specific embodiments described and depicted, nor to the specific numerical values given in the specification.

What is claimed is:

1. A method for producing a neutron pulse of short duration and high initial neutron flux density at the point of origin, by directing a focussed laser radiation pulse of high energy content and short duration onto a small volume comprising densely packed atoms which absorb an appreciable portion of the radiation pulse energy and undergo neutron-yielding nuclear reactions when heated by the absorbed energy, said atoms being selected from the group consisting of deuterium and tritium, said laser pulse having a duration which is preferably shorter than $10^{-7}$ seconds.

2. A method according to claim 1, wherein the density of the atoms, within said volume is at least $10^{20}$ atoms per cc.

3. A method as defined in claim 2 wherein said small volume is $10^{-7}$ cm.$^3$.

4. A method according to claim 2, wherein said volume measured in cc. is not greater than about $3 \times 10^{-9}$ cc./watt-sec. times the laser radiation pulse energy measured in watt-sec.

5. A method according to claim 1 wherein said volume contains about 50 atomic percent of deuterium balanced by an equal amount of essentially tritium.

6. A method according to claim 1, wherein said volume comprises heavy hydrogen isotopes solified by cooling before application of said laser radiation pulse.

7. A method according to claim 1 comprising the step of sorbing heavy hydrogen isotopes by a sorbent metal before applying said laser radiation pulse to a surface of said metal.

8. A method according to claim 1 wherein heavy isotopes of hydrogen are adsorbed by the surface of a support means.

9. A method according to claim 7 characterized in that a first laser radiation pulse of lower energy and, immediately following, a second laser radiation pulse of high energy are applied.

10. An apparatus for producing a neutron pulse of short duration and high initial neutron flux density comprising a laser arrangement for producing a laser radiation pulse of short duration and high energy content; means for focussing said laser radiation into a small volume; a material of sufficient density within said volume to absorb an appreciable amount of said laser radiation pulse energy, said material being selected from the group consisting of deuterium and tritium and comprising atoms which undergo neutron-producing nuclear reactions when heated by said absorbed energy; and a vacuum chamber comprising of the path of the focussed laser radiation at least the point of focus and the portion immediately preceding that point.

11. An apparatus according to claim 10 wherein said laser arrangement comprises a laser oscillator and at least one laser amplifier.

12. An apparatus according to claim 10 characterized by a vacuum chamber which is physically separated and independent of said laser arrangement.

13. An apparatus according to claim 10 wherein said vacuum chamber has a wall section forming a Dewar bottle.

14. An apparatus according to claim 10, wherein a wall portion of said vacuum chamber is formed of a hydrogen absorbent metal foil.

15. An apparatus according to claim 13, wherein at least a portion of said wall section is formed by a metal foil.

16. An apparatus for producing a neutron pulse of a duration in the order of $10^{-9}$ seconds and of an initial neutron flux density of at least $10^{21}$ neutrons per square centimeter and second, including a laser arrangement adapted to produce radiation pulses of short duration and of high power; optical means for focussing said laser radiation into a very small volume focus region; a vacuum chamber comprising said focus region and at least a portion of the path of the focussed radiation immediately preceding said focus region; and heavy isotopes of hydrogen having a specific density of at least $10^{19}$ atoms/cc. within said focus region.

17. An apparatus according to claim 16, wherein said focus region has a volume measured in cc. which is about $3 \times 10^{-9}$ cc./watt-sec. times the laser radiation pulse energy measured in watt-sec.

18. An apparatus according to claim 16, wherein said laser arrangement delivers a radiation pulse having an energy content of at least 10 to 100 watt-sec.

19. An apparatus according to claim 16, wherein said laser arrangement delivers a pulse of a duration less than $10^{-7}$.

20. An apparatus according to claim 19, wherein said duration is less than $10^{-8}$ seconds.

References Cited

UNITED STATES PATENTS 3,214,563    10/1965    Ford.
3,320,422    5/1967    St. John _____ 250—84.5

RALPH G. NILSON, *Primary Examiner.*

SAUL ELBAUM, *Assistant Examiner.*

U.S. Cl. X.R.

331—94.5